United States Patent [19]

Lisec

[11] Patent Number: 5,685,437
[45] Date of Patent: Nov. 11, 1997

[54] DEVICE FOR STORING GLASS PLATES OR INSULATING GLASS PANES

[76] Inventor: Peter Lisec, Bahnhofstrasse 34, A-3363 Amstetten-Hausmening, Austria

[21] Appl. No.: 530,903

[22] Filed: Sep. 20, 1995

[30] Foreign Application Priority Data

Sep. 27, 1994 [AT] Austria ................................. 1837/94

[51] Int. Cl.$^6$ ........................................ A47F 7/00
[52] U.S. Cl. ............................................... 211/41
[58] Field of Search .................... D6/407, 629, 630; 211/40, 41, 46, 28, 70.5, 119.18; D34/29; 198/779

[56] References Cited

U.S. PATENT DOCUMENTS

| | | | |
|---|---|---|---|
| 2,005,099 | 6/1935 | McLeod | 211/41 |
| 2,518,624 | 8/1950 | Kraft | 211/41 X |
| 2,681,233 | 6/1954 | Smith | 211/41 X |
| 2,940,402 | 6/1960 | Hansen et al. | 211/41 X |
| 3,719,284 | 3/1973 | Rasmusson et al. | 211/41 X |
| 3,913,965 | 10/1975 | Müller et al. | 211/41 X |
| 4,853,019 | 8/1989 | Blank et al. | 65/106 |
| 4,904,112 | 2/1990 | McDonald | 405/45 |
| 4,993,540 | 2/1991 | van Capelleveen | D34/29 X |
| 5,131,937 | 7/1992 | Kuster et al. | 65/181 |
| 5,209,627 | 5/1993 | Lisec | 414/398 |
| 5,505,574 | 4/1996 | Piazza | 211/41 X |

FOREIGN PATENT DOCUMENTS

0 477 163  12/1993  European Pat. Off. .
0 603 151   6/1994  European Pat. Off. .

OTHER PUBLICATIONS

Versa Ferguson Conveyor Corp. Publication—received ∂PTO Aug. 21, 1980 in D34/29.

*Primary Examiner*—Robert W. Gibson, Jr.
*Attorney, Agent, or Firm*—Young & Thompson

[57] ABSTRACT

A device for storing plate-shaped articles (11, 12) such as glass plates or insulating glass panes has several roughly vertically aligned compartments (10) for holding articles (11, 12), these compartments (10) being bounded by lateral supports in the form of tensioned rod- or cord-like elements (9), which can for example be steel cables. To prevent direct contact between articles (11, 12) and these elements (9), separate cylindrical pipe sections (30) are placed over the elements (9), which can rotate relative to the elements (9). Pipe sections (30) can move relative to the elements (9) in their longitudinal direction and a gap in which there are no pipe sections (30) is provided between the uppermost pipe section (30) on each element (9) and a holder (6) for the upper ends of the elements (9). In this way, when articles (11, 12) move horizontally, pipe sections (30) can roll with them and can slide along with them in a vertical movement so that the articles (11, 12) are not damaged by these movements.

3 Claims, 2 Drawing Sheets

DEVICE FOR STORING GLASS PLATES OR INSULATING GLASS PANES

BACKGROUND OF THE INVENTION

1. Field of the Invention

The invention relates to a device for storing plate-shaped articles such as glass plates or insulating glass panes with several roughly vertically aligned compartments for holding the articles, the compartments being bounded by lateral supports in the form of tensioned rod- or cord-like elements.

2. Description of Related Art

A device of this type is known from EP-A-477 163 (=U.S. Pat. No. 209 627) and EP-A-603 151.

In order to protect plate-shaped articles against damage by rod- or cord-like elements, for example, steel cables, according to EP-A-603 151 the rod- or cord-like elements are coated with plastic coverings. These plastic coverings however have the disadvantage that each time a glass plate is pushed in or out its front edge or corner pushes against the plastic covering and damages it by peeling off a piece or that in the case of sharp edges of the glass plate the plastic coverings are cut.

To prevent this, for example in EP-A-477 163 it is proposed that rollers be provided on the rod- or cord-like elements which border the compartments. These rollers however relative to the rod- or cord-like elements have a relatively large diameter so that they require a comparatively large amount of space and thus at the same compartment width and number of compartments of the device they result in a wider device or that the number of compartments is reduced with the same device width.

SUMMARY OF THE INVENTION

Therefore the object of the invention is to avoid these disadvantages in the device of the initially mentioned type.

This object is achieved according to the invention in a genetic device by placing over the rod- or cord-like elements several separate cylindrical pipe sections which can be turned relative to the rod- or cord-like elements.

The invention calls for pipe sections which wear very little relative to the rod- or cord-like elements, i.e., they increase their diameter only little; this is possible by means of their tubular shape with a length of for example to 2 to 3 cm. Because they can turn relative to the rod- or cord-like elements the glass plates roll on them without the aforementioned damage occurring.

Preferably it can be provided that the pipe sections have the shape of an external cylinder envelope by which the outside contour of the side supports remains essentially cylindrical.

Since in certain embodiments of generic devices, as are described, for example, in EP-A-477 163 and EP-A-603 151, raisable or lowerable conveying means are assigned to the compartments, vertical movements of the plate-shape articles occur which would be prevented if rollers were provided, as in EP-A-477 163, against which the articles with their upper longitudinal edges would push. For the plastic covering according to EP-A-603 151 in turn they would be damaged.

To enable these vertical movements, according to another preferred embodiment of the invention it is therefore provided that the pipe sections can be moved relative to the rod- or cord-like elements in their longitudinal direction.

Since the pipe sections can be moved relative to the rod- or cord-like elements in their longitudinal direction, upon vertical movement of the plate-shaped elements they can move with them without hindering this movement or damaging the pipe sections by relative movement between the plate-shaped articles and the pipe sections.

To enable this relative movement of the pipe sections in the longitudinal direction to the rod- or cord-like elements the invention can be developed for example by providing a distance in which there are no pipe sections between the uppermost pipe section on each rod- or cord-like element and the holder of the upper ends of the rod- or cord-like elements.

In this way, depending on the height of the plate-shaped articles the pipe section located on and over the uppermost longitudinal edge of the respective article can move freely upward and then fall again after the article has been either removed from the compartment or lowered again.

BRIEF DESCRIPTION OF THE DRAWINGS

Other features and advantages of the invention follow from the following description of the embodiments of the invention.

DESCRIPTION OF THE PREFERRED EMBODIMENT

Figure 1:
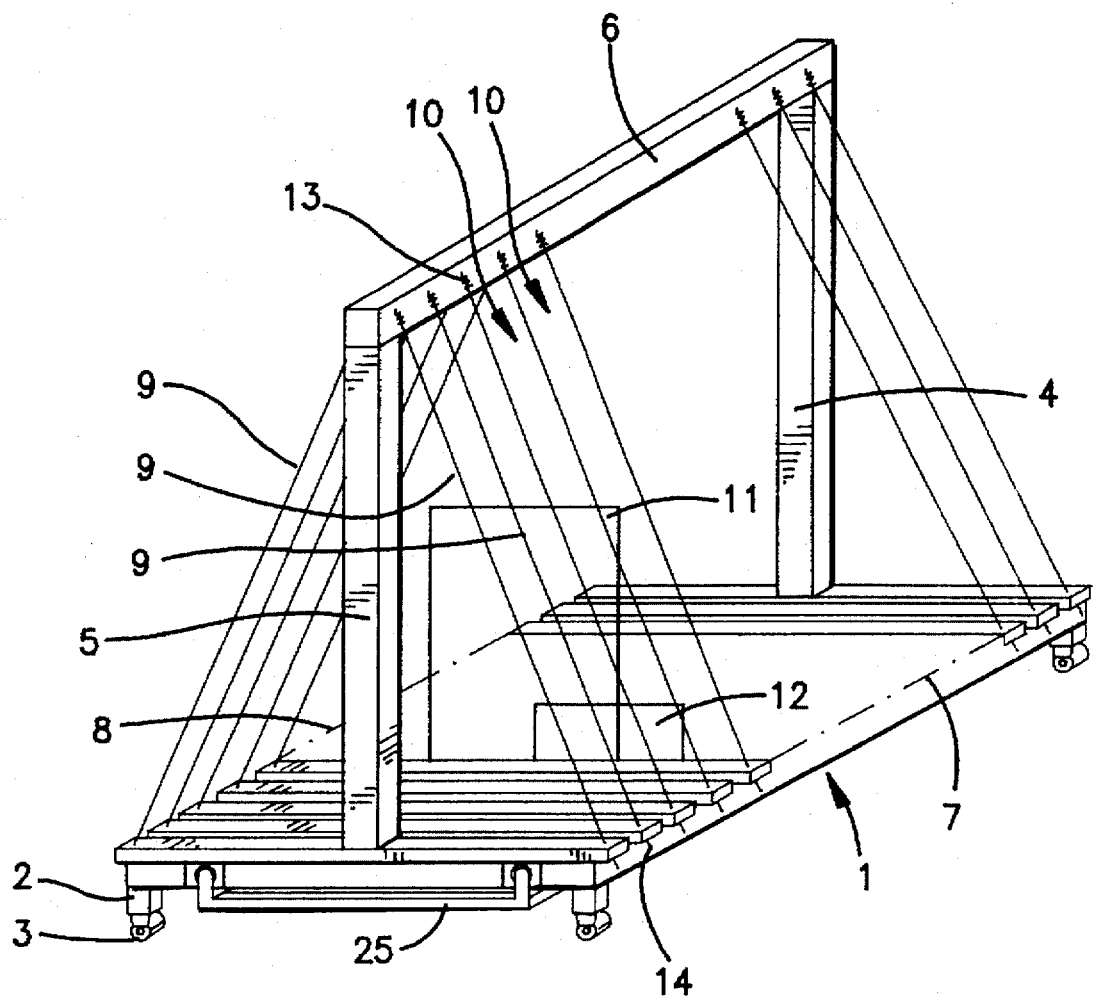
FIG. 1 shows a perspective view of a device for storing plate-shaped articles in an oblique view.

The device consists of bottom plate 1 which has feet 2 on its underside. Feet 2 can, as shown in the drawing, be equipped with rollers 3, in which at least some of rollers 3 can be formed as guide rollers. The device is then a so-called "compartment car".

From bottom plate 1 vertical members 4 and 5 project upward and bear beam 6 on their upper ends.

Between longitudinal edges 7 and 8 of bottom plate 1 and beam rod- or cord-like elements 9 are tensioned which form one compartment 10 at a time between each other, into which plate-shaped articles 11, 12 can be pushed. Pipe sections 30 which are not shown in FIGS. 1 and 3 and which are described in detail below are placed over rod- or cord-like elements 9.

An embodiment is also possible in which rod- or cord-like elements 9 are tensioned by beam 6 only to one side, i.e., to longitudinal edge 7 or 8 of bottom plate 1. In this embodiment vertical members 4 and 5 are located preferably on one of the longitudinal edges of bottom plate 1, i.e, in two corners thereof.

Figure 2:
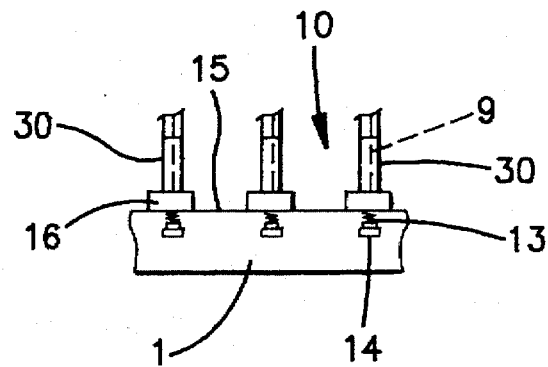
FIG. 2 shows an elevation view of a detail of this device.
Figure 4:
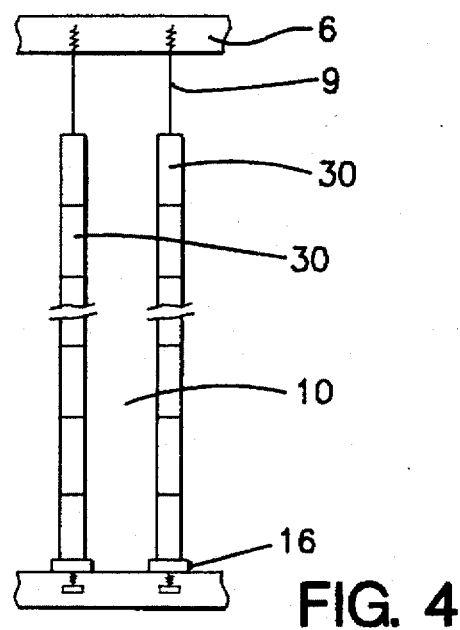
FIG. 4 shows an elevation view of rod- or cord-like elements with the pipe sections according to the invention.
Figure 5:
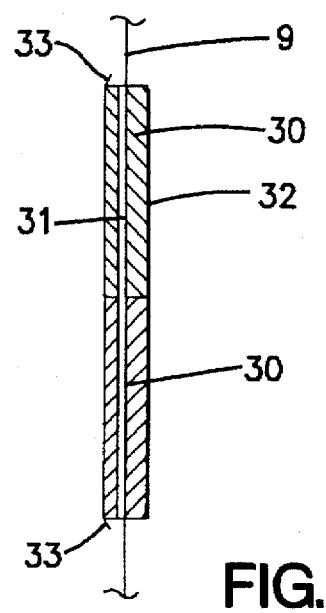
FIG. 5 shows a partial sectional view of an extract of FIG. 4 on an enlarged scale and in cross section.

Rod- or cord-like elements 9 are for example steel cables over which pipe sections 30 which are not detailed in FIGS. 4 and 5 are pushed. To ensure the necessary tension of rod- or cord-like elements 9, as is known from EP-A-477 613, on one or both ends of elements 9 short springs 13 can be provided which can be tensioned using nuts 14 in order to pretension the elements (FIG. 2).

In the area of each compartment 10 in the top of bottom plate 1 there are grooves 15 which are bounded on either side by strips 16 which for example are screwed onto bottom plate 1 or are formed in one piece with it. In doing so grooves 15 are somewhat narrower than the width of compartments 10 which is determined by rod- or cord-like elements 9 so that there is guiding of plate-shaped articles 11, 12 to be pushed in and they cannot drag lengthwise on articles 11, 12 deposited in adjacent compartments 10. Furthermore, grooves 15 ensure that plate-shaped articles deposited in compartments 10 only in the area of their upper edge lie against one or the other rod- or cord-like element 9 which borders compartment 10.

Due to the sloped position of rod- or cord-like elements 9 which border compartments 10, per compartment 10 two rod- or cord-like elements are enough to keep safe the deposition of articles 11, 12 with different height (extension of the articles to be deposited measured perpendicularly to bottom plate 1).

Figure 3:
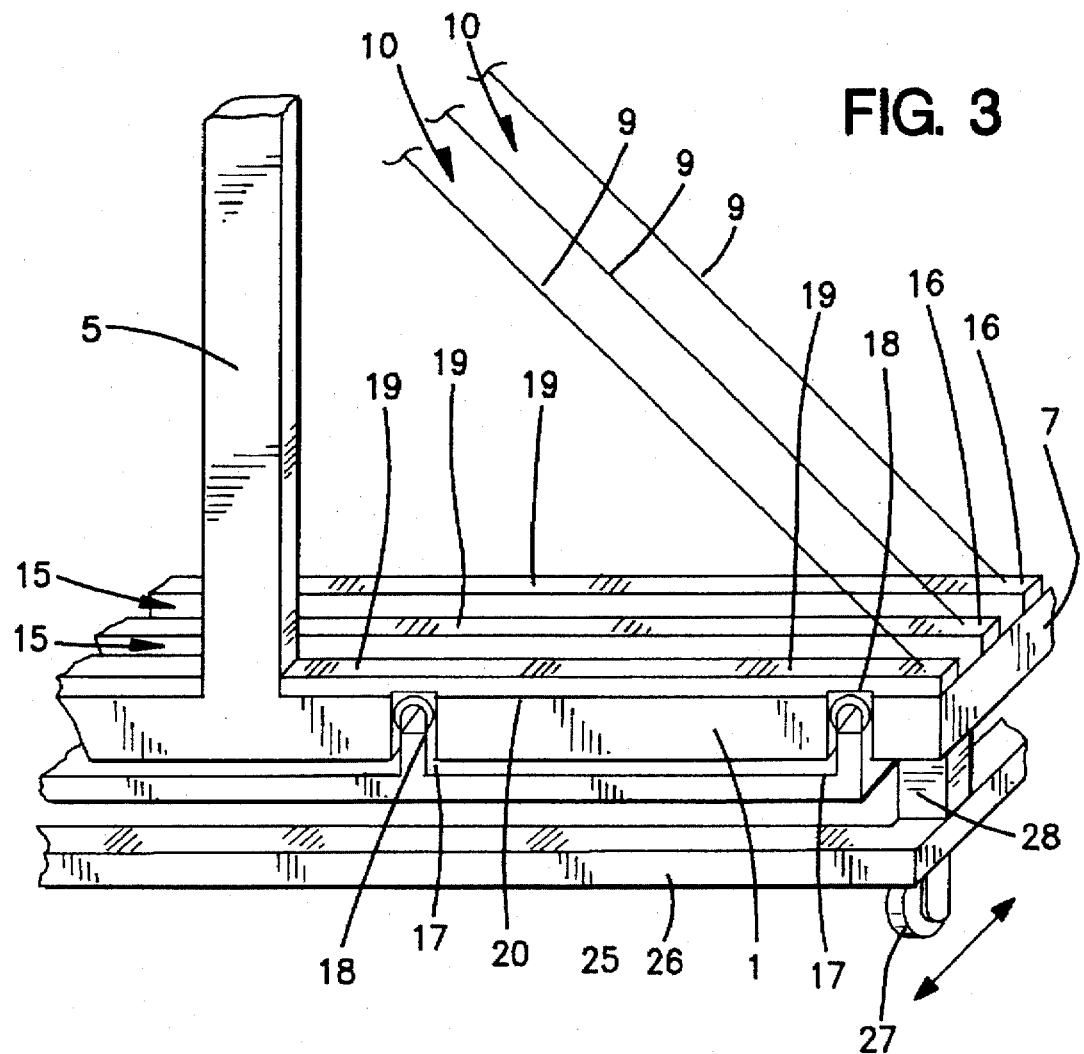
FIG. 3 shows one part of another embodiment of the invention.

As is apparent from FIGS. 1 and 3, in bottom plate 1 there are recesses 17 which are open to the bottom, which run transversely to grooves 15, and in which transport rollers 18 are held. In this regard there can also be recesses 19 which are located above recesses 17 in bottom plate 1 which run transversely to grooves 15 also in strips 16 on their side 20 which faces bottom plate 1. Recesses 19 in strips 16 are so deep that transport rollers 18 can be raised so far that they project into grooves 15 and thus can convey plate-shaped articles 11, 12 into or out of compartments 10.

Transport rollers 18 in the embodiment shown are attached to frame 25 which is either rigidly attached to bottom plate 1, however is preferably adjustable for example via hydraulic cylinders relative to bottom plate 1 so that transport rollers 18 can be disengaged from plate-shaped articles 11, 12 held in compartments 10.

In the embodiment shown in FIG. 1 frame 25 in which transport rollers 18 are supported is located on bottom plate 1.

In FIG. 3 frame 25 is located on base frame 26 in a manner not shown and it can be optionally raised and lowered, for example, via hydraulic cylinders. The device stands with feet 28 on the base frame. Base frame 26 has castors 27, of which at least one pair can be made as guide rollers. In this way the device with compartments 10 can be moved either for itself alone (FIG. 1) or over base frame 26 (FIG. 3) and can be positioned relative to an upstream conveyance device, but for example also relative to another compartment car located behind the compartment car so that for example glass plate patterns can be sorted according to any ordering criteria into successive compartment cars as is known from EP-A-477 163.

FIGS. 4 and 5 show on an enlarged scale rod- or cord-like element 9 with cylindrical pipe sections 30 which are pushed over it and which are not shown in FIGS. 1 and 3. Pipe sections 30 have the shape of a tubular sleeve with hole 31 and cylindrical outside envelope 32 and via faces 33 which perpendicularly to their longitudinal axis lie loosely against one another. Pipe sections 30 are preferably made of plastic.

Lowermost pipe section 30, as shown in FIGS. 2 and 4, lies on strip 16 and uppermost pipe section 30 is spaced away from beam 6 or springs 13 at least as far as the distance of the stroke of frame 25.

If when it is pushed in or out a glass plate pushes or lies against pipe section 30, it can turn freely on its rod- or cord-like element 9 so that it rolls off on the glass plate and is not cut or otherwise damaged by it.

If a glass plate is raised by frame 25 while it rests for example slightly tilted relative to steel cable 9 with its upper longitudinal edge against pipe section 30, this pipe section 30 and pipe sections 30 located over it are likewise pushed upward without relative motion which damages pipe sections 30 occurring between the pipe sections and the glass plate and without the lifting movement of the glass plates being hindered.

Thus the invention makes it possible to prevent direct contact between the plate-shaped articles, such as glass plates or insulating glass panes, and the lateral supports with tensioned rod- or cord-like elements, for example steel cables, without unnecessary wasting of space or preventing the lifting motion of the articles as according to EP-A-477 163 or very high wear of plastic coatings as in EP-A-603 151 occurring.

In summary the invention can be described as follows:

A device for storing plate-shaped articles 11, 12 such as glass plates or insulating glass panes has several roughly vertically aligned compartments 10 for holding articles 11, 12, compartments 10 being bounded by lateral supports in the form of tensioned rod- or cord-like elements 9. To prevent direct contact between articles 11, 12 and rod- or cord-like elements 9, for example, steel cables, over rod- or cord-like elements 9 several separate cylindrical pipe sections 30 are placed which can be turned relative to rod- or cord-like elements 9. Pipe sections 30 can move relative to rod- or cord-like elements 9 in their longitudinal direction and a distance in which there are no pipe sections 30 is provided between uppermost pipe section 30 on each rod- or cord-like element 9 and holder 6 of the upper ends of the rod- or cord-like elements 9. In this way when articles 11, 12 move horizontally pipe sections 30 can roll off on them and can slide along in vertical movement so that they are not damaged by these movements.

I claim:

1. A device for storing plate-shaped articles having a plurality of substantially vertical compartments for holding the articles, each of said plurality of compartments being bounded by lateral supports including tensioned elements; the improvement comprising a plurality of separate cylindrical pipe sections (30) on each respective element (9), said plurality of pipe sections being rotatable relative to said each element (9), said plurality of pipe sections being freely movable lengthwise relative to said each element, wherein a distance in which there are no pipe sections (30) is provided between an uppermost pipe section (30) on said each element (9) and a respective holder (6) of an upper end of said each element (9) thereby to permit substantial vertical movement of each of said plurality of sections relative to said respective elements.

2. A device according to claim 1, wherein ends (33) of each of said plurality of pipe sections (30) are perpendicular to said each element (9).

3. A device according to claim 1, wherein the pipe sections (30) are plastic.

* * * * *